US012719201B2

(12) United States Patent
Kao

(10) Patent No.: US 12,719,201 B2
(45) Date of Patent: Aug. 25, 2026

(54) CONNECTOR ASSEMBLY WITH BRACKET FEATURES

(71) Applicant: MOLEX, LLC, Lisle, IL (US)

(72) Inventor: Ming-Huei Kao, New Taipei City (TW)

(73) Assignee: Molex, LLC, Lisle, IL (US)

( * ) Notice: Subject to any disclaimer, the term of this patent is extended or adjusted under 35 U.S.C. 154(b) by 328 days.

(21) Appl. No.: 18/239,138

(22) Filed: Aug. 29, 2023

(65) Prior Publication Data

US 2024/0072483 A1 Feb. 29, 2024

(30) Foreign Application Priority Data

Aug. 29, 2022 (CN) ......................... 202211041127.9

(51) Int. Cl.

| | |
|---|---|
| ***H01R 13/506*** | (2006.01) |
| ***H01R 12/71*** | (2011.01) |
| ***H01R 13/502*** | (2006.01) |
| ***H01R 13/508*** | (2006.01) |
| ***H01R 13/659*** | (2011.01) |

(52) U.S. Cl.

CPC ......... *H01R 13/506* (2013.01); *H01R 12/716* (2013.01); *H01R 13/502* (2013.01); *H01R 13/508* (2013.01); *H01R 13/659* (2013.01)

(58) Field of Classification Search

None

See application file for complete search history.

(56) References Cited

U.S. PATENT DOCUMENTS

| | | | | |
|---|---|---|---|---|
| 8,197,282 | B1 * | 6/2012 | Su ...................... | H01R 13/6587 439/541.5 |
| 9,142,922 | B2 * | 9/2015 | Regnier ................. | H01R 12/00 |

(Continued)

FOREIGN PATENT DOCUMENTS

| | | |
|---|---|---|
| CN | 107111075 A | 8/2017 |
| CN | 114583511 A | 6/2022 |

(Continued)

*Primary Examiner* — Oscar C Jimenez

(57) ABSTRACT

A connector assembly includes a guiding shield cage, at least two receptacle modules, at least two partitioning brackets and at least two extending brackets. The receptacle modules are provided to a rear segment of an interior of the guiding shield cage. The partitioning brackets include a first partitioning bracket and a second partitioning bracket, the partitioning brackets are arranged side by side and are provided in the guiding shield cage, a rear end of each partitioning bracket is positioned in front of a front end of corresponding one of the receptacle modules. The extending brackets includes a first extending bracket which is assembled to the first partitioning bracket and a second extending bracket which is assembled to the second partitioning bracket, the extending brackets are arranged side by side and are respectively assembled to rear ends of the partitioning brackets, each extending bracket is capable of moving relative to the partitioning bracket assembled therewith between a front position where each extending bracket is positioned in front of a front end of the corresponding receptacle module and a rear position where each extending bracket at least partially extends into the corresponding receptacle module.

18 Claims, 13 Drawing Sheets

(56) References Cited

U.S. PATENT DOCUMENTS

| | | | | |
|---|---|---|---|---|
| 9,252,538 | B2 * | 2/2016 | Recce | H01R 13/7175 |
| 10,153,571 | B2 | 12/2018 | Kachlic | |
| 2006/0003632 | A1 * | 1/2006 | Long | H05K 9/0058 439/607.2 |
| 2015/0043152 | A1 * | 2/2015 | Zhang | G11B 33/124 312/333 |
| 2017/0279236 | A1 | 9/2017 | Chen | |
| 2022/0190506 | A1 | 6/2022 | Yang | |
| 2023/0246396 | A1 * | 8/2023 | Kao | H01R 13/508 439/676 |

FOREIGN PATENT DOCUMENTS

| | | | |
|---|---|---|---|
| TW | I733519 | B | 7/2021 |
| TW | 202218266 | A | 5/2022 |

* cited by examiner

CONNECTOR ASSEMBLY WITH BRACKET FEATURES

RELATED APPLICATIONS

This application claims priority to Chinese Utility Application No. 202211041127.9, which was filed Aug. 29, 2022; the contents therein are incorporated by reference in its entirety.

TECHNICAL FIELD

The present disclosure relates to a connector assembly, and particularly relates to a connector assembly which has a partitioning bracket.

BACKGROUND

Chinese patent document CN106469878A (corresponding to U.S. Pat. No. 10,153,571B2) discloses a connector system, a cage of the connector system includes an intermediate section, the intermediate section includes an upper wall and a lower wall, the upper wall and the lower wall together define an upper port and a lower port in the cage, the lower wall includes a hole formed therein so that the intermediate section and the lower port are communicated with each other, a biased heat sink of the connector system is arranged in the intermediate section between the upper port and the lower port, the biased heat sink extends through the hole and enters into the lower port. The cage disclosed in the connector system is positioned over a stacked connector, an opening formed to a bottom portion of the cage allows the stacked connector to be capable of being arranged inside the cage, a rear end of the intermediate section is necessary to extend to between an upper receptacle and a lower receptacle of the stacked connector. However, in an assembling case that the stacked connector needs to be mounted on a circuit board in advance and the cage which is assembled later needs to cover the stacked connector from up to down, the intermediate section of the cage which will be assembled later will interfere with the stacked connector, the cage which will be assembled later cannot be assembled.

SUMMARY

Therefore, an object of the present disclosure is to provide a connector assembly which can improve at least one deficiency of the prior art.

Accordingly, in some embodiments, a connector assembly of the present disclosure comprises a guiding shield cage, at least two receptacle modules, at least two partitioning brackets and at least two extending brackets. The receptacle modules are provided to a rear segment of an interior of the guiding shield cage. The partitioning brackets comprising a first partitioning bracket and a second partitioning bracket, the partitioning brackets are arranged side by side and are provided in the guiding shield cage, each partitioning bracket and the guiding shield cage define an upper receiving space and a lower receiving space, a rear end of each partitioning bracket is positioned in front of a front end of corresponding one of the receptacle modules. The extending brackets comprises a first extending bracket which is assembled to the first partitioning bracket and a second extending bracket which is assembled to the second partitioning bracket, the extending brackets are arranged side by side and are respectively assembled to the rear ends of the two partitioning brackets, each extending bracket is capable of moving relative to the partitioning bracket assembled therewith between a front position where each extending bracket is positioned in front of a front end of the corresponding receptacle module and a rear position where each extending bracket at least partially extends into the corresponding receptacle module.

In some embodiments, each extending bracket has side walls and guiding members which are provided to the side walls, the guiding shield cage has partitioning plates and guiding rails which are provided to the partitioning plates, the guiding members of the extending bracket are slidably front and rear provided to the corresponding guiding rails.

In some embodiments, the side walls of each extending bracket comprise a first side wall and a second side wall, the guiding members of each extending bracket comprise a first guiding member which is provided to the first side wall and a second guiding member which is provided to the second side wall, the first guiding member and the second guiding member of each extending bracket are staggered with each other up and down.

In some embodiments, each extending bracket further has a first avoiding groove which is provided to the first side wall and a second avoiding groove which is provided to the second side wall, the first avoiding groove and the second avoiding groove of each extending bracket are staggered with each other up and down; the second guiding member of the second side wall of the first extending bracket is accommodated in the first avoiding groove of the first side wall of the second extending bracket, the first guiding member of the first side wall of the second extending bracket is accommodated in the second avoiding groove of the second side wall of the first extending bracket.

In some embodiments, the partitioning plates of the guiding shield cage comprises a first partitioning plate, a second partitioning plate and a middle partitioning plate which is positioned between the first partitioning plate and the second partitioning plate, the guiding rails of the guiding shield cage comprises first guiding rails which are respectively provided to the first partitioning plate and the middle partitioning plate and second guiding rails which are respectively provided to the middle partitioning plate and the second partitioning plate; the first guiding member of the first side wall of the first extending bracket is slidably front and rear provided to the first guiding rail of the first partitioning plate, the second guiding member of the second side wall of the first extending bracket is slidably front and rear provided to the second guiding rail of the middle partitioning plate; the first guiding member of the first side wall of the second extending bracket is slidably front and rear provided to the first guiding rail of the middle partitioning plate, the second guiding member of the second side wall of the second extending bracket is slidably front and rear provided to the second guiding rail of the second partitioning plate.

In some embodiments, the guiding members of each extending bracket further comprises a third guiding member which provided to at least one of the side walls of the extending bracket; the guiding rails of the guiding shield cage further comprises a third guiding rail which is provided to at least one of the partitioning plates of the guiding shield cage, the third guiding member of the extending bracket is slidably front and rear provided to the corresponding third guiding rail.

In some embodiments, the third guiding member of each extending bracket is provided to the second side wall of the extending bracket, the third guiding rails of the guiding shield cage are respectively provided to the middle partitioning plate and the second partitioning plate; the third guiding member of the second side wall of the first extending bracket is slidably front and rear provided to the third guiding rail of the middle partitioning plate, the third guiding member of the second side wall of the second extending bracket is slidably front and rear provided to the third guiding rail of the second partitioning plate.

In some embodiments, the connector assembly further comprises holding members, each extending bracket has a first holding portion which latches with the holding member when each extending bracket is in the front position and a second holding portion which latches with the holding member when each extending bracket is the rear position.

In some embodiments, each partitioning bracket has side walls, the holding members are elastic latching pieces which are constructed to the side walls of the partitioning brackets.

In some embodiments, each extending bracket has side walls, the first holding portion of the extending bracket is a recessed groove which is constructed to the side wall of the extending bracket, the second holding portion of the extending bracket is a recessed channel which is constructed to the side wall of the extending bracket.

In some embodiments, each partitioning bracket has side walls, the side walls of the partitioning bracket comprises a first side wall and a second side wall; the holding members are elastic latching pieces, the elastic latching pieces comprises first elastic latching pieces which are constructed to the first side walls of the partitioning brackets and second elastic latching pieces which are constructed to the second side walls of the partitioning brackets; each extending bracket has side walls, the side walls of the extending bracket comprises a first side wall and a second side wall, the first side wall and the second side wall of the extending bracket each are constructed with the first holding portion and the second holding portion; the first elastic latching piece and the second elastic latching piece of each partitioning bracket are staggered with each other up and down, the second elastic latching piece of the first partitioning bracket and the first elastic latching piece of the second partitioning bracket which are adjacent to each other are staggered with each other up and down In some embodiments, the first holding portion of the first side wall and the first holding portion of the second side wall in each extending bracket are staggered with each other up and down.

In some embodiments, the guiding shield cage has partitioning plates and avoid openings which are provided to the partitioning plates and avoid the elastic latching pieces.

In some embodiments, each partitioning bracket further has a first avoid aperture which is provided to the first side wall and corresponds to the second elastic latching piece and a second avoid aperture which is provided to the second side wall and corresponds to the first elastic latching piece; the second avoid aperture of the first partitioning bracket avoids the first elastic latching piece of the second partitioning bracket, the first avoid aperture of the second partitioning bracket avoids the second elastic latching piece of the first partitioning bracket.

In some embodiments, each partitioning bracket has side walls and guiding member receiving notches which are provided to the side walls, when the extending bracket is in the front position, the guiding members of the extending bracket are received in the guiding member receiving notches of the corresponding partitioning bracket.

In some embodiments, each extending bracket has a lower stopping portion which extends into the lower receiving space, when the extending bracket is in the front position, a pluggable module which enters into the lower receiving space is capable of pushing the lower stopping portion to make the extending bracket move rearwardly to the rear position.

In some embodiments, each partitioning bracket has an upper wall and a lower wall which together define an internal receiving space, the lower wall is formed with a lower window which makes the internal receiving space communicated with the lower receiving space, the connector assembly further comprises two internal biasing heat sinks which are respectively provided to the internal receiving spaces of the two partitioning brackets, the internal biasing heat sink comprises an internal heat dissipating member which passes through the lower window to enter into the lower receiving space, the internal heat dissipating member is capable of being moved up and down, the extending bracket sheathes the corresponding internal heat dissipating member and is sheathed by the corresponding partitioning bracket.

Before the assembling operation, the two extending brackets which are respectively assembled to the rear ends of the two partitioning brackets can move to the front position where the two extending brackets do not interfere with the receptacle modules, and, after assembling operation, the two extending brackets can move to the rear position where the two extending brackets each at least partially extend into between the receptacle module, therefore, it can prevent the two extending brackets from interfering with the receptacle modules in the assembling process so as to be beneficial to assembling operation. In addition, the two extending brackets are capable of independently moving and doing not interfere with each other. Moreover, by that the guiding members of the extending brackets are slidably front and rear provided to the corresponding guiding rails respectively, the two extending brackets which are arranged side by side can be guided, limited and supported.

BRIEF DESCRIPTION OF THE DRAWINGS

Other features and effects of the present disclosure will be apparent from an embodiment with reference to the drawings, in which.

Figure 1:
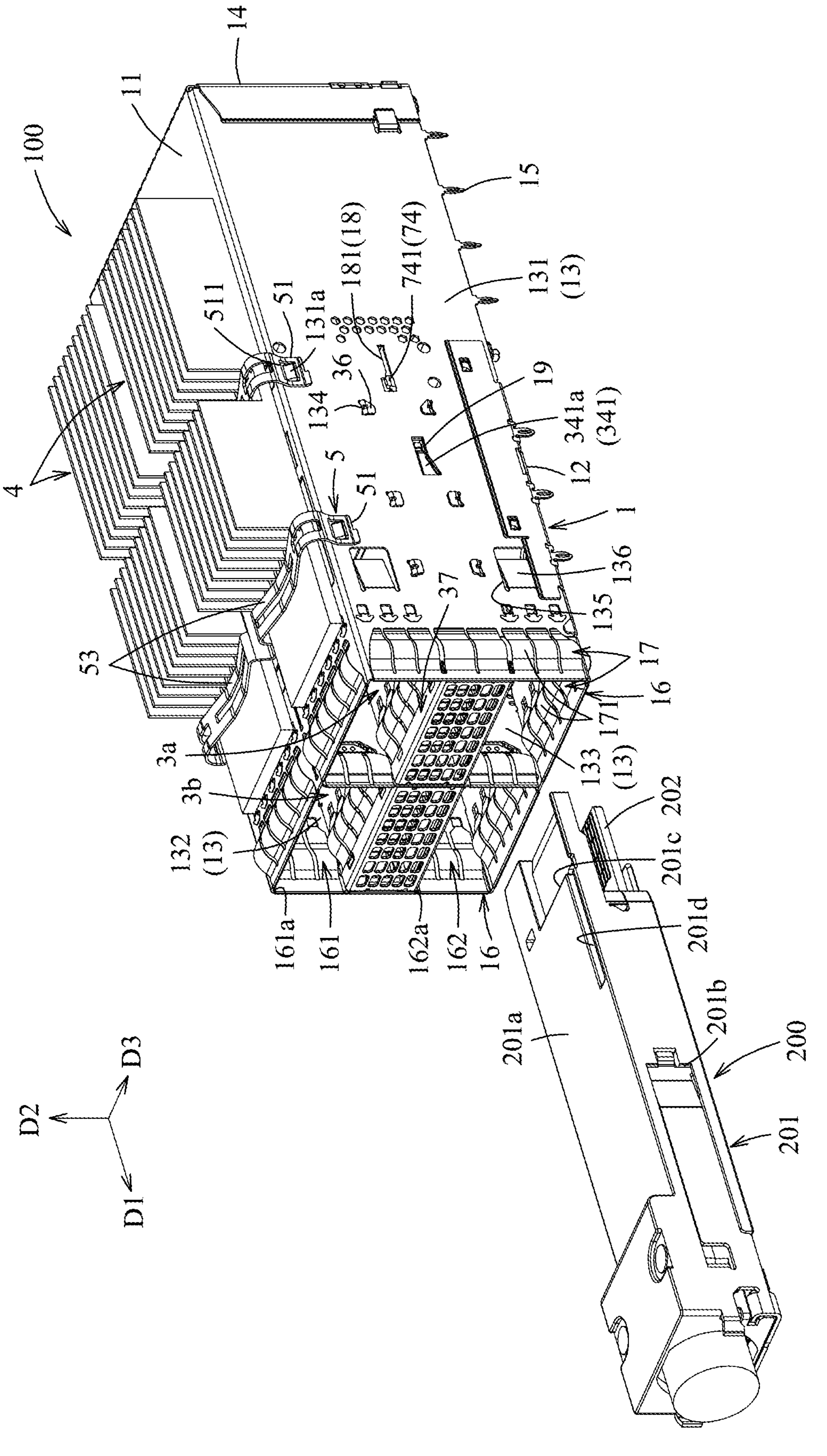
FIG. 1 is a perspective view of an embodiment of a connector assembly of the present disclosure and a pluggable module.

Reference numerals are presented as follows.

100 connector assembly
1 guiding shield cage
11 top plate
111 first upper positioning hole
112 second upper positioning hole
113 first fixing through hole
114 second fixing through hole
115 upper window
116 upper stopping portion
117 upper guiding portion
118 penetrating hole
12 bottom plate
13 partitioning plate
131 first partitioning plate
131*a* latching protrusion
132 second partitioning plate
132*a* latching protrusion
133 middle partitioning plate
133*a* first upper positioning piece
133*b* second upper positioning piece
133*c* first upper fixing bendable piece
133*d* second upper fixing bendable piece
133*e* fixing piece
134 fixing hole
135 opening
136 inward extending elastic piece
14 rear plate
15 pressing fit leg
16 receiving passageway
161 upper receiving space
161*a* upper inserting port
162 lower receiving space
162*a* lower inserting port
162*b* bottom opening
17 first grounding member
171 elastic finger
18 guiding rail
181 first guiding rail
182 second guiding rail
183 third guiding rail
19 avoid opening
2 receptacle module
21 receptacle connector
211 receptacle body
212 terminal
212*a* contacting portion
212*b* tail portion
3 partitioning bracket
3*a* first partitioning bracket
3*b* second partitioning bracket
31 upper wall
32 lower wall
321 lower window
322 lower guiding portion
33 front wall
34 side wall
341 elastic latching piece
341*a* first elastic latching piece
341*b* second elastic latching piece
342 first side wall
343 second side wall
35 internal receiving space
36 fixing bendable piece
37 second grounding member
371 piece body
372 grounding piece
372*a* elastic finger
38 guiding member receiving notch
39*a* first avoid aperture
39*b* second avoid aperture
4 upper heat sink
41 heat dissipating base plate
411 thermal coupling portion
42 heat dissipating fin
5 clip
51 latching portion
511 latching hole
52 fixing portion
521 positioning hole
522 avoiding hole
523 fixing hole
53 pressing portion
6 internal biasing heat sink
61 internal heat dissipating member
611 inner heat dissipating base plate
611*a* thermal coupling portion
612 heat dissipating fin
62 biasing spring
621 pressing plate
622 plate-shaped spring piece
7 extending bracket
7*a* first extending bracket
7*b* second extending bracket
71 upper wall
72 lower wall
721 lower stopping portion
73 side wall
731 first side wall
732 second side wall
74 guiding member
741 first guiding member
742 second guiding member
743 third guiding member
75 first avoiding groove
76 second avoiding groove
77 first holding portion
78 second holding portion
200 pluggable module
201 shell member
201*a* inserting portion
201*b* locking recessed groove
201*c* aligning structure
201*d* guiding groove
202 mating circuit board
D1 front-rear direction D2 up-down direction
D3 left-right direction

DETAILED DESCRIPTION

Referring to FIG. 1 to FIG. 5, an embodiment of a connector assembly 100 of the present disclosure is adapted to be provided to a circuit board (not shown) and is adapted to mate with a pluggable module 200. The connector assembly 100 includes a guiding shield cage 1, at least two receptacle modules 2, at least two partitioning brackets 3*a*, 3*b*, two upper heat sinks 4, a clip 5, two internal biasing heat sinks 6, and at least two extending brackets 7*a*, 7*b*.

The guiding shield cage 1 for example is formed by processing, such as stamping and bending, a metal plate, the guiding shield cage 1 extends along a front-rear direction D1 (a direction to which an arrow points is front, and an opposite direction is rear) and has a top plate 11 which is positioned to the up in an up-down direction D2 (a direction to which an arrow points is up, and an opposite direction is down) and a bottom plate 12 which is positioned to the down, a plurality of partitioning plates 13 which are connected between the top plate 11 and the bottom plate 12 and are spaced apart from each other and are arranged side by side along a left-right direction D3 (a direction to which an arrow points is right, and an opposite direction is left) and a rear plate 14, a bottom portion of the guiding shield cage 1 includes a plurality of pressing fit legs 15, the plurality of pressing fit legs 15 are used to press into a plurality of pressing fit holes (not shown) of the circuit board, so that the guiding shield cage 1 is fixedly provided to the circuit board and may be electrically connected to a ground wiring (not shown) of the circuit board. In the present embodiment, the plurality of partitioning plates 13 of the guiding shield cage 1 include a first partitioning plate 131, a second partitioning plate 132 and a middle partitioning plate 133 which is positioned between the first partitioning plate 131 and the second partitioning plate 132, the plurality of partitioning plates 13 and the top plate 11, the bottom plate 12 and the rear plate 14 together define two receiving passageways 16 which are arranged side by side along the left-right direction D3.

The middle partitioning plate 133 is assembled between the top plate 11 and the bottom plate 12. The top plate 11 has a first upper positioning hole 111, a second upper positioning hole 112, a first fixing through hole 113 and a second fixing through hole 114. The middle partitioning plate 133 has a first upper positioning piece 133*a* which correspondingly inserts into the first upper positioning hole 111, a second upper positioning piece 133*b* which correspondingly passes through the second upper positioning hole 112 and upwardly extends out of the top plate 11, and a first upper fixing bendable piece 133*c* and a second upper fixing bendable piece 133*d* which respectively correspondingly pass through the first fixing through hole 113 and the second fixing through hole 114. The first upper fixing bendable piece 133*c* is constituted by two bending piece bodies which are arranged along the front-rear direction D1, the two bending piece bodies are used to pass through the first fixing through hole 113 and then respectively bend toward two sides along the left-right direction D3 to generate fixing function. The second fixing bendable piece 133*d* passes through the second fixing through hole 114 of the top plate 11 and bends along the left-right direction D3 and is fixed, so that the middle partitioning plate 133 is assembled to the top plate 11.

The receptacle modules 2 the present embodiment are two in number. The two receptacle modules 2 are provided on the circuit board and are provided in a rear segment of an interior of the guiding shield cage 1. The receptacle module 2 has two receptacle connectors 21 which are toward the front, are arranged along the up-down direction D2 and are insulated from each other. Each receptacle connector 21 has a receptacle body 211 and a plurality of terminals 212 which are provided to the receptacle body 211. Each terminal 212 has a contacting portion 212*a* which is positioned to the receptacle body 211 and a tail portion 212*b* which extends downwardly from a bottom portion of the receptacle module 2 and is used to be mechanically and electrically connected to the circuit board.

The partitioning brackets 3*a*, 3*b* of the present embodiment are two in number, the two partitioning brackets 3*a*, 3*b* include a first partitioning bracket 3*a* and a second partitioning bracket 3*b* which are respectively provided in the two receiving passageways 16 of the guiding shield cage 1, and each partitioning bracket 3*a*, 3*b* partitions the corresponding receiving passageway 16 of the guiding shield cage 1 into an upper receiving space 161 and a lower receiving space 162 which respectively correspond to the two receptacle connectors 21 of the corresponding receptacle module 2, a rear segment of the upper receiving space 161 and a rear segment of the lower receiving space 162 are communicated with each other. The upper receiving space 161 has an upper inserting port 161*a* which is positioned to the front and allows the pluggable module 200 to insert therein, the lower receiving space 162 has a lower inserting port 162*a* which is positioned to the front and allows the pluggable module 200 to insert therein and a bottom opening 162*b* which is positioned at the rear of a bottom portion of the lower receiving space 162 and is defined together by the partitioning plates 13, the bottom plate 12 and the rear plate 14 of the guiding shield cage 1. The bottom opening 162*b* allows the receptacle module 2 to enter therein so that the receptacle module 2 is received in the rear segment of the upper receiving space 161 and the rear segment of the lower receiving space 162 which are communicated with each other.

Referring to FIG. 5 to FIG. 9, in the present embodiment, each partitioning bracket 3*a*, 3*b* has an upper wall 31 and a lower wall 32 which face each other up and down, a front wall 33 which is connected to a front edge of the upper wall 31 and a front edge of the lower wall 32, and two side walls 34 which are connected to side edges of the upper wall 31 and side edges of the lower wall 32, the upper wall 31, the lower wall 32, the front wall 33 and the two side walls 34 together define an internal receiving space 35. Each partitioning plate 13 of the guiding shield cage 1 has fixing holes 134 which are penetratingly formed, each partitioning bracket 3*a*, 3*b* further has fixing bendable pieces 36 which extend to outer sides of the two side walls 34, the fixing bendable pieces 36 of the two partitioning brackets 3*a*, 3*b* respectively pass through the fixing holes 134 of the plurality of partitioning plates 13 and then bend and are fixed, so that the two partitioning brackets 3*a*, 3*b* are assembled to the guiding shield cage 1. In addition, it is noted that, the fixing bendable pieces 36 at a left side of the partitioning bracket 3*a*,3*b* and the fixing bendable piece 36*b* at a right side of the partitioning bracket 3*a*, 3*b* are constructed to be staggered with each other in the front-rear direction D1, so the adjacent fixing bendable pieces 36 of the two partitioning brackets 3*a*, 3*b* are staggered with each other to be assembled on the same middle partitioning plate 133.

Figure 2:
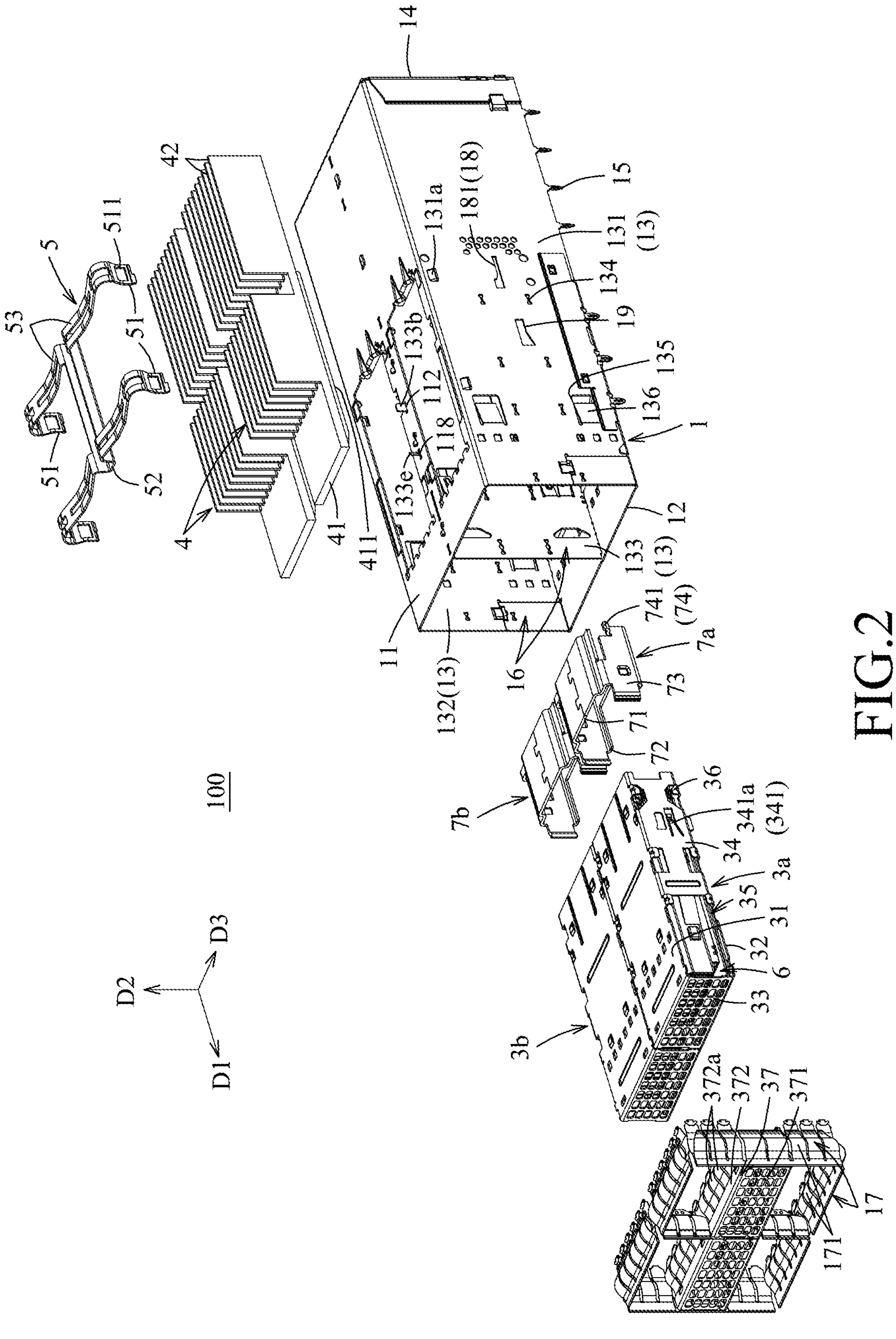
FIG. 2 is a perspective exploded view of the embodiment with receptacle modules omitted.

Referring to FIG. 1 to FIG. 2, in the present embodiment, the connector assembly 100 may be provided to a mounting hole (not shown) of a casing (not shown), the guiding shield cage 1 is provided with a plurality of first grounding members 17 which are positioned at a front end of the guiding shield cage 1. Each partitioning bracket 3*a*, 3*b* further is provided with a second grounding member 37 which is positioned at the front wall 33 and a front segment of the upper wall 31 and a front segment of the lower wall 32. The plurality of first grounding members 17 have a plurality of elastic fingers 171 which extend rearwardly from the front end of the guiding shield cage 1 and are distributed to an outer side of the guiding shield cage 1 and an inner side of the guiding shield cage 1, the elastic finger 171*a* of the plurality of elastic fingers 171 which is positioned at the outer side of the guiding shield cage 1 is used to contact an edge of the mounting hole of the casing, the elastic finger 171*a* of the plurality of elastic fingers 171 which is positioned at the inner side of the guiding shield cage 1 is used to contact the pluggable module 200. The second grounding member 37 has a piece body 371 which is provided to a front side surface of the front wall 33 of each partitioning bracket 3*a*, 3*b* and two grounding pieces 372 which respectively extend rearwardly from an upper edge of the piece body 371 and a lower edge of the piece body 371 to respectively extend into the upper receiving space 161 and the lower receiving space 162. Each grounding piece 372 has a plurality of elastic fingers 372*a* which extend rearwardly and are used to contact the pluggable module 200.

The pluggable module 200 has a shell member 201 and a mating circuit board 202. The shell member 201 has an inserting portion 201*a* which is used to insert into the upper receiving space 161 or the lower receiving space 162, the mating circuit board 202 is positioned to a front end of the inserting portion 201*a* and is used to insert into the receptacle connector 21. Each partitioning plate 13 of the guiding shield cage 1 has inward extending elastic pieces 136 which respectively correspond to the upper receiving space 161 and the lower receiving space 162, the inward extending elastic piece 136 is constructed at an opening 135 and extends rearwardly and obliquely toward the interior of the guiding shield cage 1. A left side and a right side of the inserting portion 201*a* of the pluggable module 200 each are provided with a locking recessed groove 201*b* which correspondingly cooperates with the inward extending elastic piece 136, the inward extending elastic pieces 136 are used to cooperate with the locking recessed grooves 201*b* of the pluggable module 200, so as to generate locking effect.

Referring to FIG. 1, FIG. 3 and FIG. 8 to FIG. 10, in addition, a top portion of the front end of the inserting portion 201*a* of the shell member 201 is further formed with an aligning structure 201*c* and a guiding groove 201*d*. The top plate 11 of the guiding shield cage 1 is formed with two upper windows 115 which are respectively communicated with the upper receiving spaces 161 of the two receiving passageways 16, two upper stopping portions 116 which respectively extend downwardly from rear edges of the two upper windows 115 into the upper receiving spaces 161 of the two receiving passageways 16, and two upper guiding portions 117 which respectively extend downwardly from side edges of the two upper windows 115 into the upper receiving spaces 161 of the two receiving passageways 16. The lower wall 32 of the partitioning bracket 3*a*, 3*b* is formed with a lower window 321 which allows the internal receiving space 35 to be communicated with the corresponding lower receiving space 162 and a lower guiding portion 322 which extends downwardly from a side edge of the lower window 321 into the lower receiving space 162 of the corresponding receiving passageway 16. The upper stopping portion 116 is used to stop the aligning structure 201*c* to limit an inserting position of the pluggable module 200, the upper guiding portion 117 and the lower guiding portion 322 each are used to extend into the guiding groove 201*d* to guide the pluggable module 200.

Figure 3:
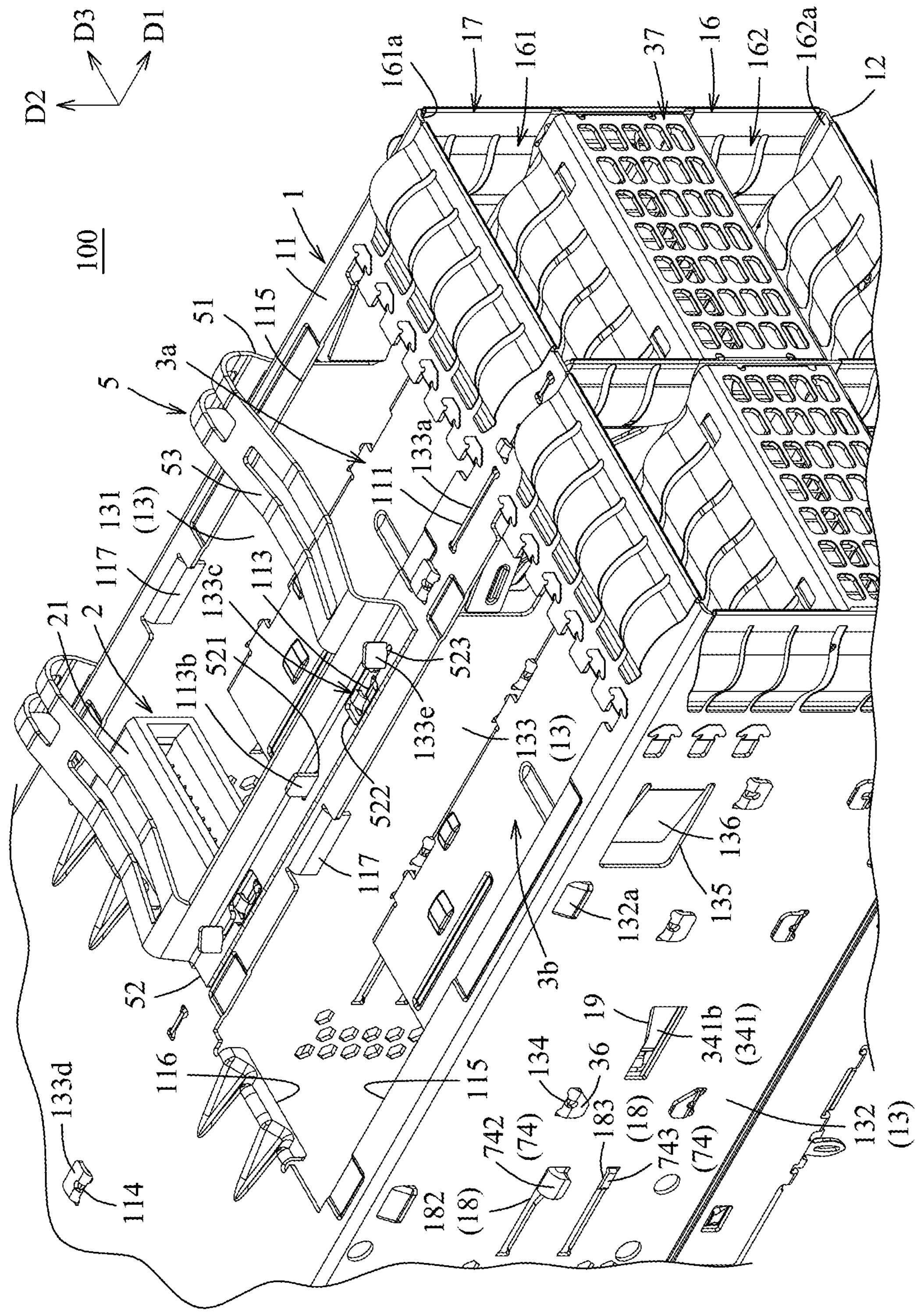
FIG. 3 is a partially cut-away perspective view of the embodiment with the receptacle modules and upper heat sinks omitted and a clip partially cut-away.

Referring to FIG. 1 to FIG. 3, the two upper heat sinks 4 are arranged side by side along the left-right direction D3 and are respectively provided on the top plate 11 of the guiding shield cage 1. Each upper heat sink 4 has a heat dissipating base plate 41 which is provided to the top plate 11 and a plurality of heat dissipating fins 42 which are integrally constructed to extend upwardly from a top surface of the heat dissipating base plate 41. The plurality of heat dissipating fins 42 extend along the front-rear direction D1 and are arranged side by side in the left-right direction D3, a bottom portion of the heat dissipating base plate 41 has a thermal coupling portion 411 which passes through the corresponding upper window 115 to enter into the upper receiving space 161 of the corresponding receiving passageway 16.

The clip 5 has a plurality of latching portions 51 which respectively latch to the first partitioning plate 131 and the second partitioning plate 132 of the guiding shield cage 1, a fixing portion 52 which corresponds to the middle partitioning plate 133 and is provided to the top plate 11, and a plurality of pressing portions 53 which extend along the left-right direction D3 and respectively downwardly elastically press against the heat dissipating base plates 41 of the two upper heat sinks 4. The plurality of pressing portions 53 are arranged as two rows along the front-rear direction D1, and the plurality of pressing portions 53 are connected between the plurality of latching portions 51 and the fixing portion 52. Specifically, the first partitioning plate 131 and the second partitioning plate 132 which are positioned at the two sides of the guiding shield cage 1 are respectively formed with latching protrusions 131*a*, 132*a*, each latching portion 51 is formed with a latching hole 511 which correspondingly latches with the latching protrusion 131*a*, 132*a* of the corresponding first partitioning plate 131 or the second partitioning plate 132. The fixing portion 52 has a positioning hole 521, an avoiding hole 522 which is used to avoid the first upper fixing bendable piece 133*c*, and a fixing hole 523 which is adjacent to the avoiding hole 522. The middle partitioning plate 133 further has a fixing piece 133*e* which extends upwardly and is a larger in the up and narrow in the down, the fixing piece 133*e* is used to firstly pass through a penetrating hole 118 of the top plate 11 and then pass through the fixing hole 523 of the fixing portion 52 of the clip 5 and then be twisted by an angle so as to make the fixing portion 52 of the clip 5 fixed. By means of an elastic acting force provided by the plurality of pressing portions 53, the upper heat sinks 4 are capable of being moved along the up-down direction D2 to make the thermal coupling portion 411 of each upper heat sink 4 elastically contact the pluggable module 200 which inserts into the upper receiving space 161 of the corresponding receiving passageway 16, so as to assure contact completeness and strengthen heat dissipating performance.

Referring to FIG. 1, FIG. 4 and FIG. 9 to FIG. 10, the two internal biasing heat sinks 6 are respectively provided in the internal receiving spaces 35 of the two partitioning brackets 3*a*, 3*b*. Each internal biasing heat sink 6 has an internal heat dissipating member 61 and a biasing spring 62 which is provided between the internal heat dissipating member 61 and the upper wall 31 of the corresponding partitioning bracket 3*a*, 3*b*. The internal heat dissipating member 61 has an inner heat dissipating base plate 611 and a plurality of inner heat dissipating fins 612 which are arranged side by side along the left-right direction D3, latch with each other and are provided to a top surface of the inner heat dissipating base plate 41, the inner heat dissipating base plate 611 has a thermal coupling portion 611*a* which passes through the corresponding lower window 321 to enter into the corresponding lower receiving space 162. The biasing spring 62 has a pressing plate 621 which presses against top portions of the plurality of inner heat dissipating fins 612 of the internal heat dissipating member 61 and a plurality of plate-shaped spring pieces 622 which extend obliquely from the pressing plate 621 and upwardly press against the upper wall 31 of the corresponding partitioning bracket 3*a*, 3*b*, it is noted that, the biasing spring 62 also may be a spring structure in other form and is not limited to the present embodiment. When the pluggable module 200 inserts into the lower receiving space 162, the pluggable module 200 raises the internal heat dissipating member 61, by means of a biasing force of the biasing spring 62, the thermal coupling portion 611*a* of the internal heat dissipating member 61 contacts the pluggable module 200 with a pressure, strengthen heat dissipating performance.

Referring to FIG. 4 to FIG. 7 and FIG. 11, a rear end of each partitioning bracket 3*a*, 3*b* is positioned in front of front ends of the receptacle connectors 21 of corresponding one of the two receptacle modules 2.

Specifically, in the present embodiment, the extending brackets 7*a*, 7*b* are two in number, the two extending brackets 7*a*, 7*b* include a first extending bracket 7*a* which is assembled to the first partitioning bracket 3*a* and a second extending bracket 7*b* which is assembled to the second partitioning bracket 3*b*, the two extending brackets 7*a*, 7*b* are arranged side by side and respectively assembled to the rear ends of the two partitioning brackets 3*a*, 3*b*, and the two extending brackets 7*a*, 7*b* respectively sheathe the two internal heat dissipating members 61 and are respectively sheathed by the two partitioning brackets 3*a*, 3*b*, and the two partitioning brackets 3*a*, 3*b* respectively limit movement of the two extending brackets 7*a*, 7*b* in the up-down direction D2 and the left-right direction D3, so as to make each extending bracket 7*a*, 7*b* be capable of moving relative to the partitioning bracket 3*a*, 3*b* assembled therewith between a front position (see FIG. 4) where each extending bracket 7*a*, 7*b* is positioned in front of the front ends of the receptacle connectors 21 of the corresponding receptacle module 2 and a rear position (see FIG. 11) where each extending bracket 7*a*, 7*b* at least partially extends into the receptacle connectors 21 of the corresponding receptacle module 2.

Because the two receptacle modules 2 are firstly mounted to the circuit board and then the guiding shield cage 1 which is provided with the two partitioning brackets 3*a*, 3*b* and the two extending brackets 7*a*, 7*b* covers the two receptacle modules 2 and is fixed to the circuit board, when the two extending brackets 7*a*, 7*b* each are positioned in the front position where the extending bracket 7*a*, 7*b* is in front of the front ends of the two receptacle connectors 21 of the corresponding receptacle module 2, the two extending brackets 7*a*, 7*b* each can respectively avoid the receptacle connector 21 of the two receptacle modules 2 which is positioned in the up to prevent the two extending brackets 7*a*, 7*b* each from interfering with the receptacle connector 21 of the two receptacle modules 2 which is positioned in the up and in turn prevent assembling from being affected, and, after assembling, it may move the two extending brackets 7*a*, 7*b* rearwardly each to the rear position where the two extending brackets 7*a*, 7*b* each extend into between the two receptacle connectors 21 of the corresponding receptacle module 2, so that the two partitioning brackets 3*a*, 3*b* and the two extending brackets 7*a*, 7*b* play complete partitioning function. In general, by the two extending brackets 7*a*, 7*b* which are capable of moving between the front position and the rear position, in a precondition that the two partitioning brackets 3*a*, 3*b* and the two extending brackets 7*a*, 7*b* are capable of subsequently playing complete partitioning function, it prevents the two extending brackets 7*a*, 7*b* from interfering with the receptacle connectors 21 of the two receptacle modules 2 in a process of assembling so as to be beneficial to assembling operation.

Referring to FIG. 4 to FIG. 7 and FIG. 11, the guiding shield cage 1 further has guiding rails 18 which are provided to the plurality of partitioning plates 13 and are in form of penetrating hole construction. Each extending bracket 7*a*, 7*b* has a upper wall 71 and a lower wall 72 which face each other up and down, two side walls 73 which are connected to side edges of the upper wall 71 and side edges of the lower wall 72, and guiding members 74 which are provided to the side walls 73 and extend outwardly, the guiding members 74 of the two extending brackets 7*a*, 7*b* slidably front and rear each are provided to the corresponding guiding rail 18.

Referring to FIG. 5 to FIG. 8, specifically, the side walls 73 of each extending bracket 7*a*, 7*b* include a first side wall 731 and a second side wall 732, the guiding members 74 of each extending bracket 7*a*, 7*b* include a first the guiding member 741 which is integrally constructed to the first side wall 731, a second the guiding member 742 which is integrally constructed to the second side wall 732, and a third guiding member 743 which is integrally constructed to the second side wall 732, here, the first the guiding member 741, the second guiding member 742 and the third guiding member 743 are staggered with each other in the up-down direction D2, the second guiding member 742 is highest in position in the up-down direction D2, the first the guiding member 741 is higher in position in the up-down direction D2, and the third guiding member 743 is lowest in position in the up-down direction D2. The guiding rails 18 of the guiding shield cage 1 include two first guiding rails 181 which are respectively provided to the first partitioning plate 131 and the middle partitioning plate 133, two second guiding rails 182 which are respectively provided to the middle partitioning plate 133 and the second partitioning plate 132, and two third guiding rails 183 which are respectively provided to the middle partitioning plate 133 and the second partitioning plate 132.

The first the guiding member 741 of the first side wall 731 of the first extending bracket 7*a* is slidably front and rear provided to the first guiding rail 181 of the first partitioning plate 131, the second guiding member 742 of the second side wall 732 of the first extending bracket 7*a* is slidably front and rear provided to the second guiding rail 182 of the middle partitioning plate 133, the third guiding member 743 of the second side wall 732 of the first extending bracket 7*a* is slidably front and rear provided to the third guiding rail 183 of the middle partitioning plate 133. The first the guiding member 741 of the first side wall 731 of the second extending bracket 7*b* is slidably front and rear provided to the first guiding rail 181 of the middle partitioning plate 133, the second guiding member 742 of the second side wall 732 of the second extending bracket 7*b* is slidably front and rear provided to the second guiding rail 182 of the second partitioning plate 132, the third guiding member 743 of the second side wall 732 of the second extending bracket 7*b* is slidably front and rear provided to the third guiding rail 183 of the second partitioning plate 132.

Referring to FIG. 7 to FIG. 8 and FIG. 12 to FIG. 13, in the present embodiment, a protruding length of the third guiding member 743 is shorter, and a protruding length of the first the guiding member 741 and a protruding length of the second guiding member 742 are longer, and a tip of the first the guiding member 741 bends upwardly, a tip of the second guiding member 742 bends downwardly. Each extending bracket 7*a*, 7*b* further has a first avoiding groove 75 which is provided to the first side wall 731 and a second avoiding groove 76 which is provided to the second side wall 732, the first avoiding groove 75 and the second avoiding groove 76 of the extending bracket 7*a*, 7*b* are staggered with each other in the up-down direction D2. The second guiding member 742 of the second side wall 732 of the first extending bracket 7*a* passes through the second guiding rail 182 of the middle partitioning plate 133 and is accommodated in the first avoiding groove 75 of the first side wall 731 of the second extending bracket 7*b*, the first the guiding member 741 of the first side wall 731 of the second extending bracket 7*b* passes through the first guiding rail 181 of the middle partitioning plate 133 and is accommodated in the second avoiding groove 76 of the second side wall 732 of the first extending bracket 7*a*. By means of the first avoiding groove 75 and the second avoiding groove 76, the two extending brackets 7*a*, 7*b* are capable of independently moving and doing not interfere with each other. The protruding length of the third guiding member 743 is constructed so that the third guiding member 743 of the second side wall 732 of the first extending bracket 7*a* is capable of cooperating with the third guiding rail 183 of the middle partitioning plate 133 but doing not interfere with the first side wall 731 of the second extending bracket 7*b*. Moreover, a front end of the first guiding rail 181 and a front end of the second guiding rail 182 are opened more largely, so that an upwardly bent part of the first the guiding member 741 and a downwardly bent part of the second guiding member 742 are capable of smoothly correspondingly passing through the first guiding rail 181 and the second guiding rail 182 respectively in the assembling process.

In addition, each partitioning bracket 3*a*, 3*b* has two guiding member receiving notches 38 which are respectively provided to rear ends of the two side walls 34, when the extending bracket 7*a*, 7*b* is in the front position, the guiding members 74 (the first the guiding member 741, the second guiding member 742 and the third guiding member 743) of the extending bracket 7*a*, 7*b* are received in the guiding member receiving notches 38 of the partitioning bracket 3*a*, 3*b*.

Figure 12:
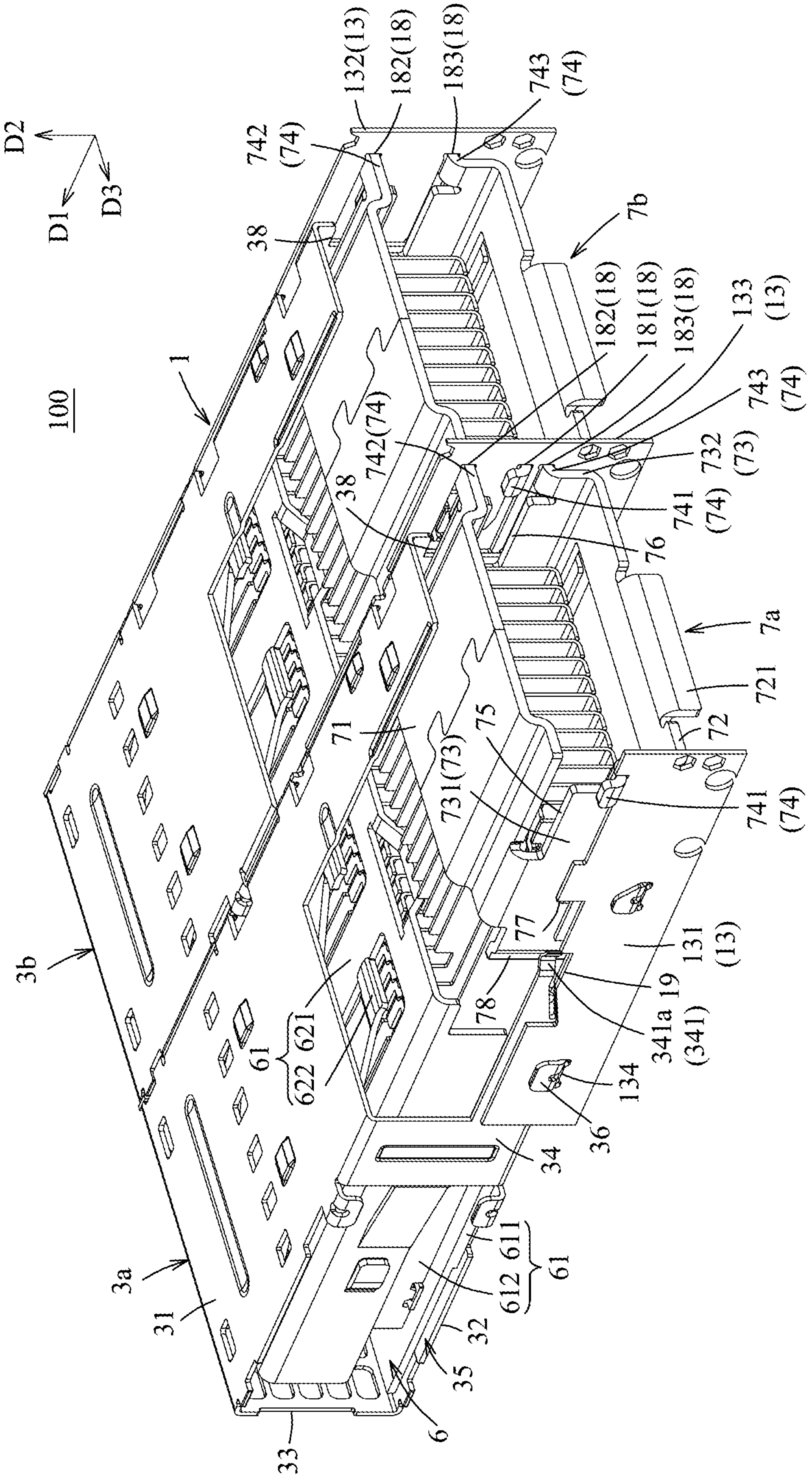
FIG. 12 is a partially cut-away perspective view of the embodiment illustrating the partitioning plates, the partitioning brackets, the extending brackets and the internal biasing heat sinks and the extending brackets are positioned in the rear position.

Referring to FIG. 5 to FIG. 8 and FIG. 12, the connector assembly 100 further includes holding members, each extending bracket 7*a*, 7*b* has a first holding portion 77 which latches with the holding member when each extending bracket 7*a*, 7*b* is in the front position (see FIG. 5) and a second holding portion 78 which latches with the holding member when each extending bracket 7*a*, 7*b* is in the rear position (see FIG. 12). Specifically, the holding members in the present embodiment are elastic latching pieces 341 which are respectively constructed on the side walls 34 of the partitioning brackets 3*a*, 3*b* and make tips thereof recessed inwardly, it is noted that, the elastic latching pieces 341 (the holding members) in other embodiments also may be constructed on the partitioning plates 13 of the guiding shield cage 1, so the present disclosure is not limited to the present embodiment.

Referring to FIG. 5 to FIG. 8, specifically, the side walls 34 of each partitioning bracket 3*a*, 3*b* include a first side wall 342 and a second side wall 343, the elastic latching pieces 341 include a first elastic latching piece 341*a* which is constructed to the first side wall 342 of the partitioning bracket 3*a*, 3*b* and a second elastic latching piece 341*b* which is constructed to the second side wall 343 of the partitioning bracket 3*a*, 3*b*. The first elastic latching piece 341*a* and the second elastic latching piece 341*b* of each partitioning bracket 3*a*, 3*b* are staggered with each other in the up-down direction D2, the second elastic latching piece 341*b* of the first partitioning bracket 3*a* and the first elastic latching piece 341*a* of the second partitioning bracket 3*b* which are adjacent to each other are staggered with each other in the up-down direction D2.

The first side wall 731 and the second side wall 732 of each extending bracket 7*a*, 7*b* each are constructed with one first holding portion 77 and one second holding portion 78. The first holding portion 77 is a recessed groove which is constructed to the side wall 73 (the first side wall 731 and the second side wall 732) of the extending bracket 7*a*, 7*b*, the second holding portion 78 is a recessed channel which is constructed at a front end of the side wall 73 (the first side wall 731 and the second side wall 732) of the extending bracket 7*a*, 7*b*. The first holding portion 77 (the recessed groove) of the first side wall 731 and the first holding portion 77 (the recessed groove) of the second side wall 732 in each extending bracket 7*a*, 7*b* are staggered up and down with each other.

The guiding shield cage 1 further has a plurality of avoid openings 19 which are provided to the plurality of partitioning plates 13 and avoid the elastic latching pieces 341. Each partitioning bracket 3*a*, 3*b* further has a first avoid aperture 39*a* which is provided to the first side wall 342 and corresponds to the second elastic latching piece 341*b* and a second avoid aperture 39*b* which is provided to the second side wall 343 and corresponds to the first elastic latching piece 341*a*. The second avoid aperture 39*b* of the first partitioning bracket 3*a* avoids the first elastic latching piece 341*a* of the second partitioning bracket 3*b*, the first avoid aperture 39*a* of the second partitioning bracket 3*b* avoids the second elastic latching piece 341*b* of the first partitioning bracket 3*a*.

Figure 5:
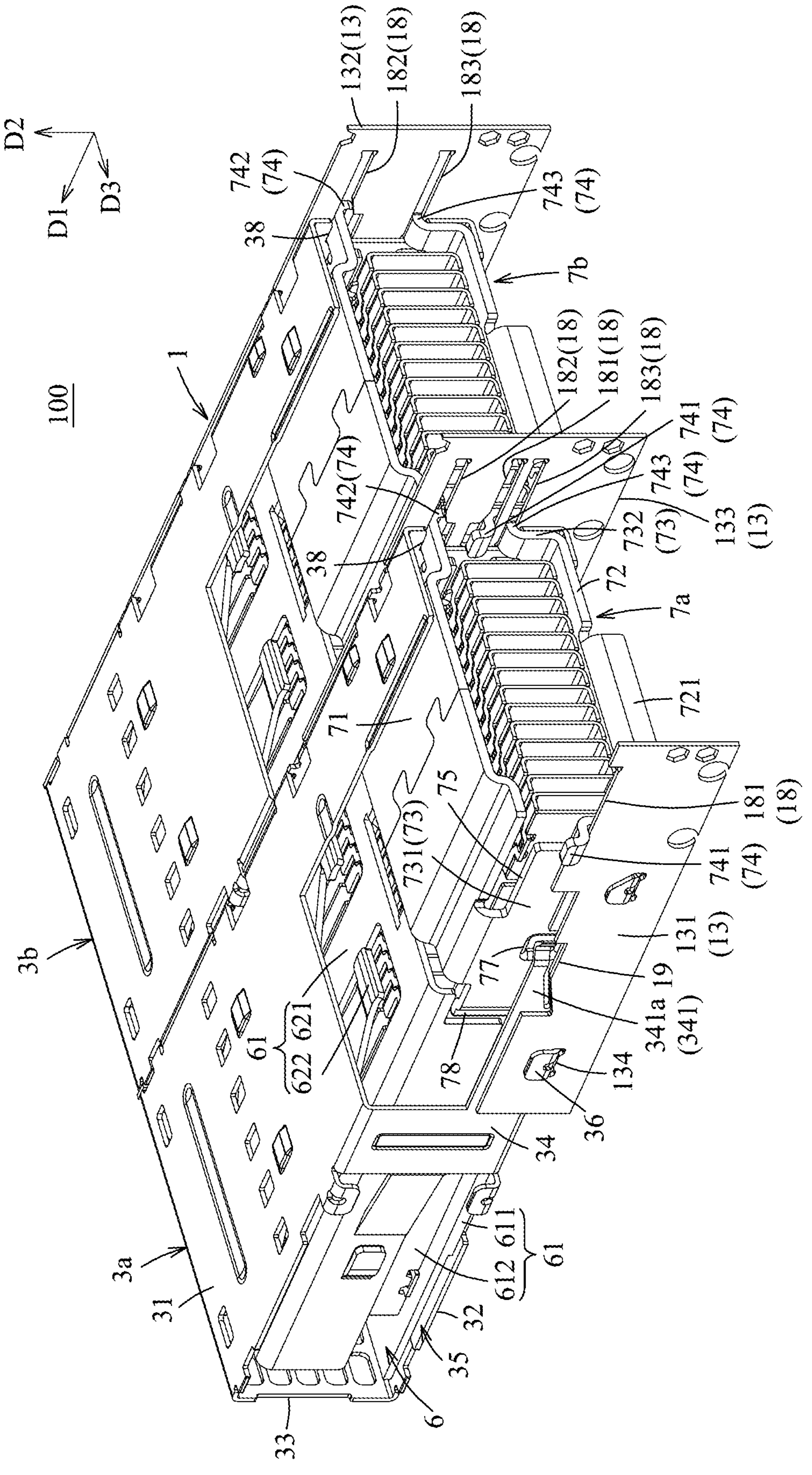
FIG. 5 is a partially cut-away perspective view of the embodiment illustrating partitioning plates, the partitioning brackets, the extending brackets and internal biasing heat sinks with the extending brackets positioned in the front position.
Figure 6:
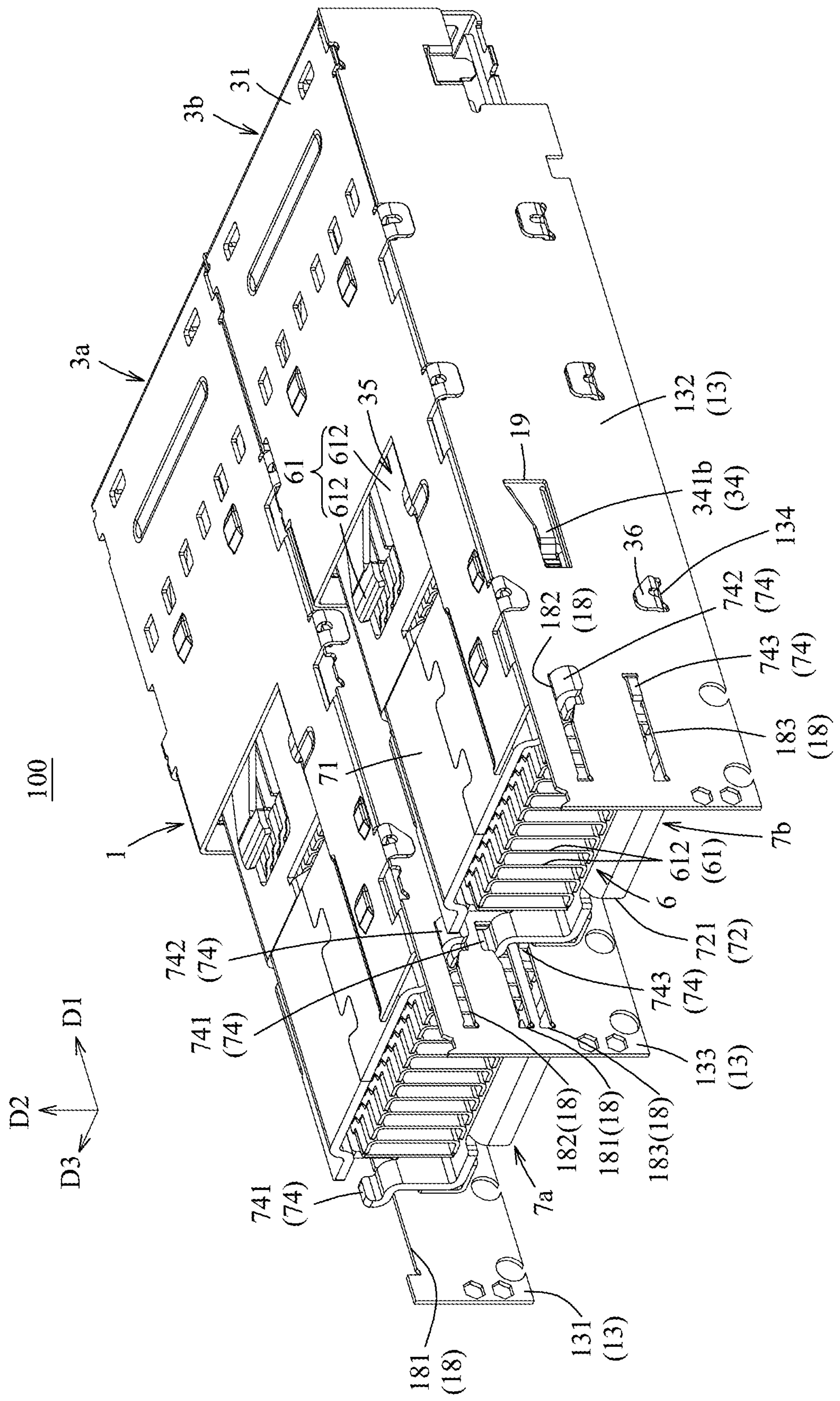
FIG. 6 is a partially cut-away perspective view of the embodiment of FIG. 5 viewed from another angle.
Figure 13:
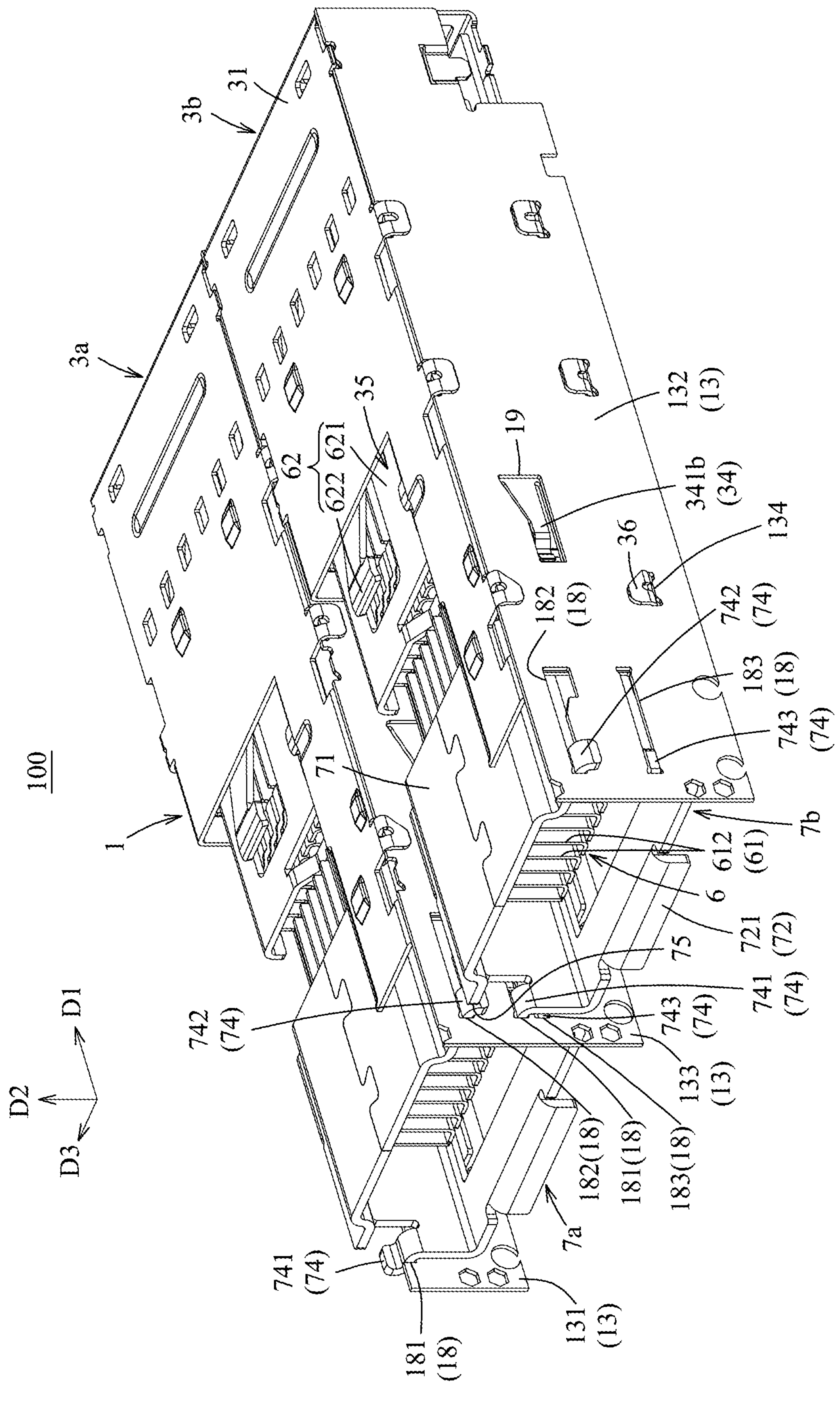
FIG. 13 is a partially cut-away perspective view of the embodiment of FIG. 12 viewed from another angle.

Referring to FIG. 5 to FIG. 6, specifically, when the extending bracket 7*a*, 7*b* is in the front position, the elastic latching pieces 341 (the holding members) respectively latch with the first holding portions 77 which each are the recessed groove, the guiding members 74 are respectively received in the guiding member receiving notches 38 and are respectively positioned in the front ends of the guiding rails 18; referring to FIG. 12 to FIG. 13, when the extending bracket 7*a*, 7*b* moves from the front position to the rear position, the elastic latching pieces 341 (the holding members) respectively pass over the side walls 73 of the extending bracket 7*a*, 7*b* and latch with the second holding portions 78 which each are the recessed channel at the front end of the corresponding side wall 73, the guiding members 74 leave the guiding member receiving notches 38 and respectively move to the rear ends of the guiding rails 18. By the corresponding latching cooperation between the elastic latching pieces 341 (the holding members) and the first holding portions 77 and the second holding portions 78, the extending bracket 7*a*, 7*b* can be positioned in the front position and the rear position, and by the corresponding cooperation between the guiding members 74 and the guiding rails 18, the extending bracket 7*a*, 7*b* can be subjected to sufficient guiding, limiting and supporting.

Figure 4:
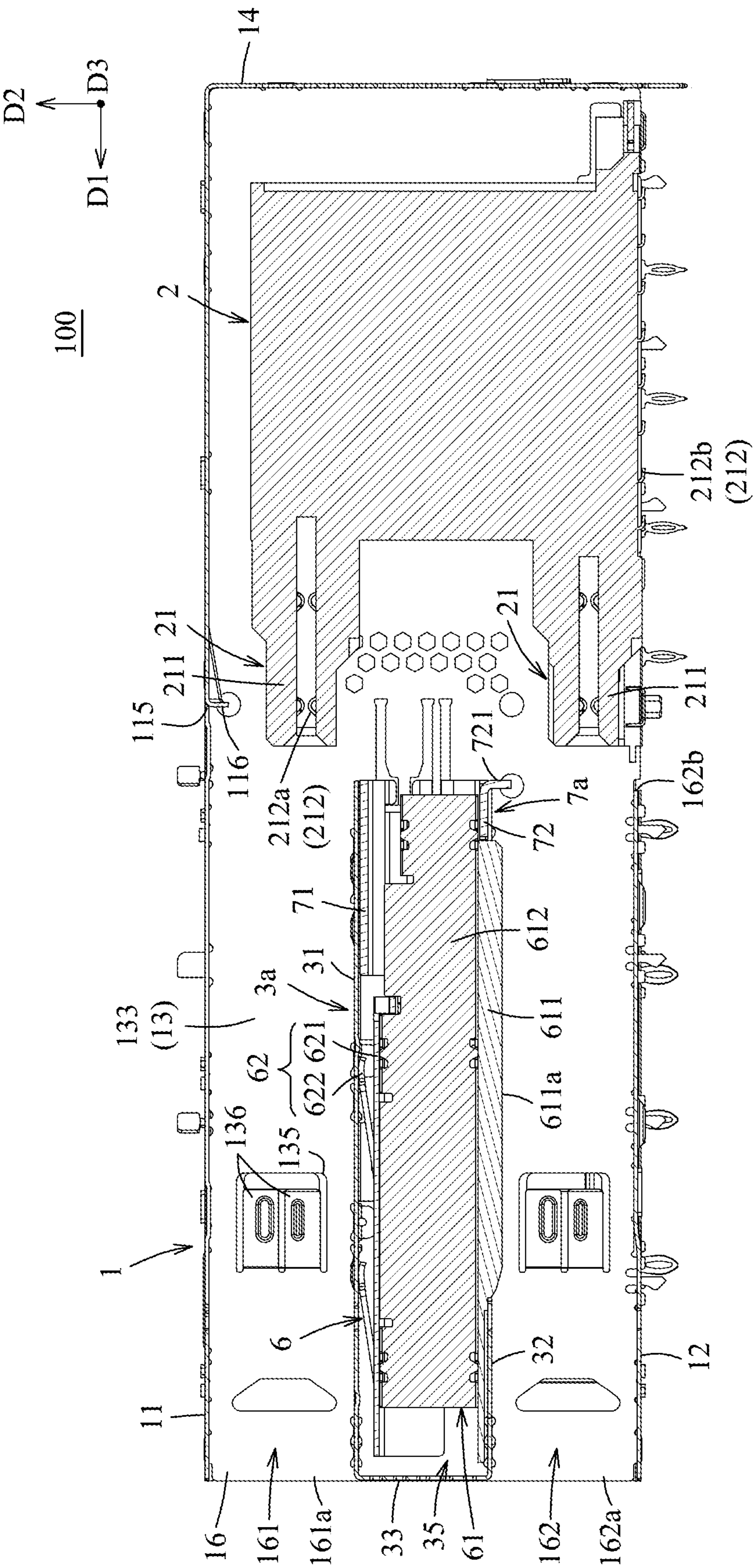
FIG. 4 is a cross sectional view of the embodiment with the upper heat sinks and the clip omitted and extending brackets positioned in a front position.
Figure 7:
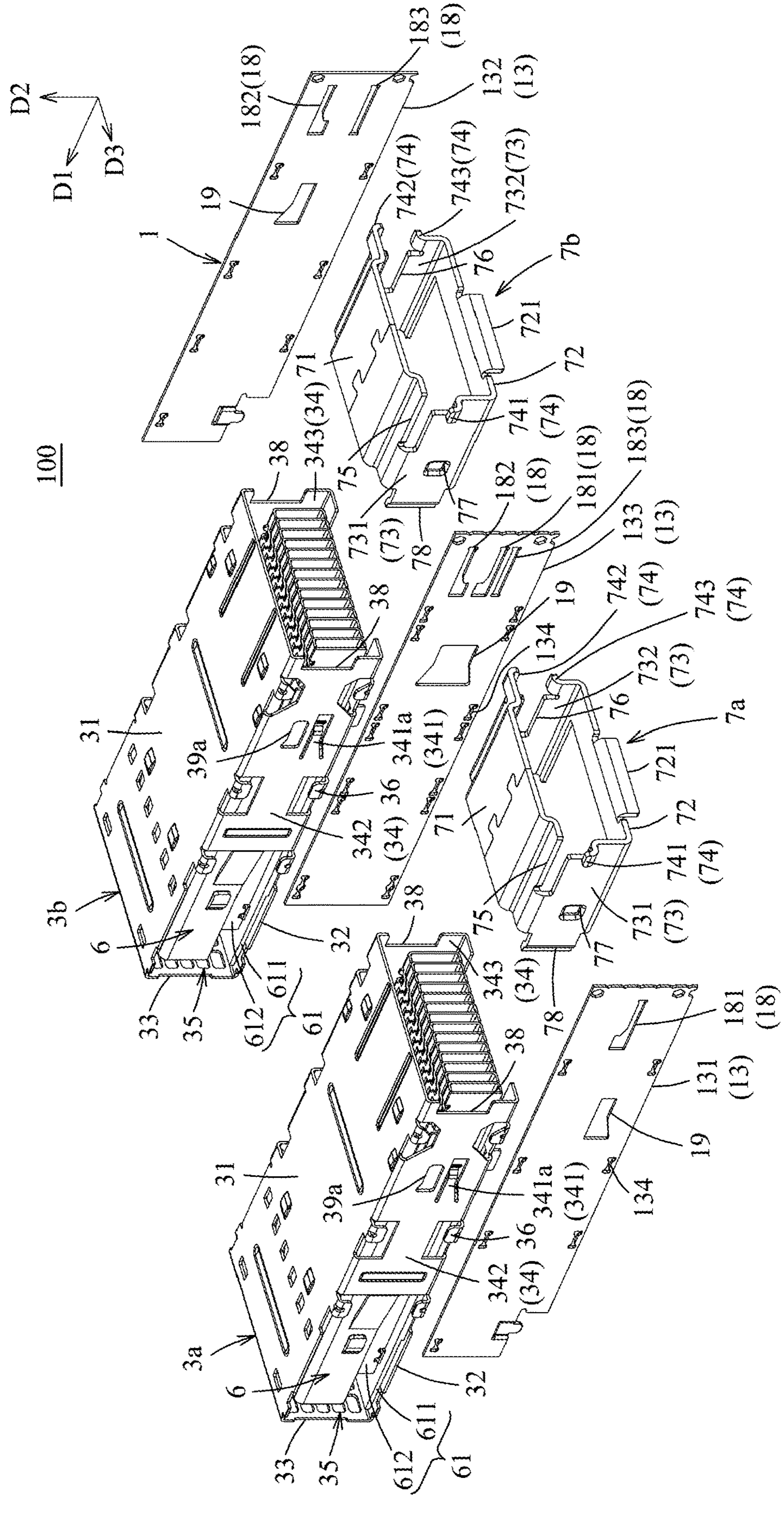
FIG. 7 is a partial perspective exploded view of the embodiment of FIG. 5.
Figure 8:
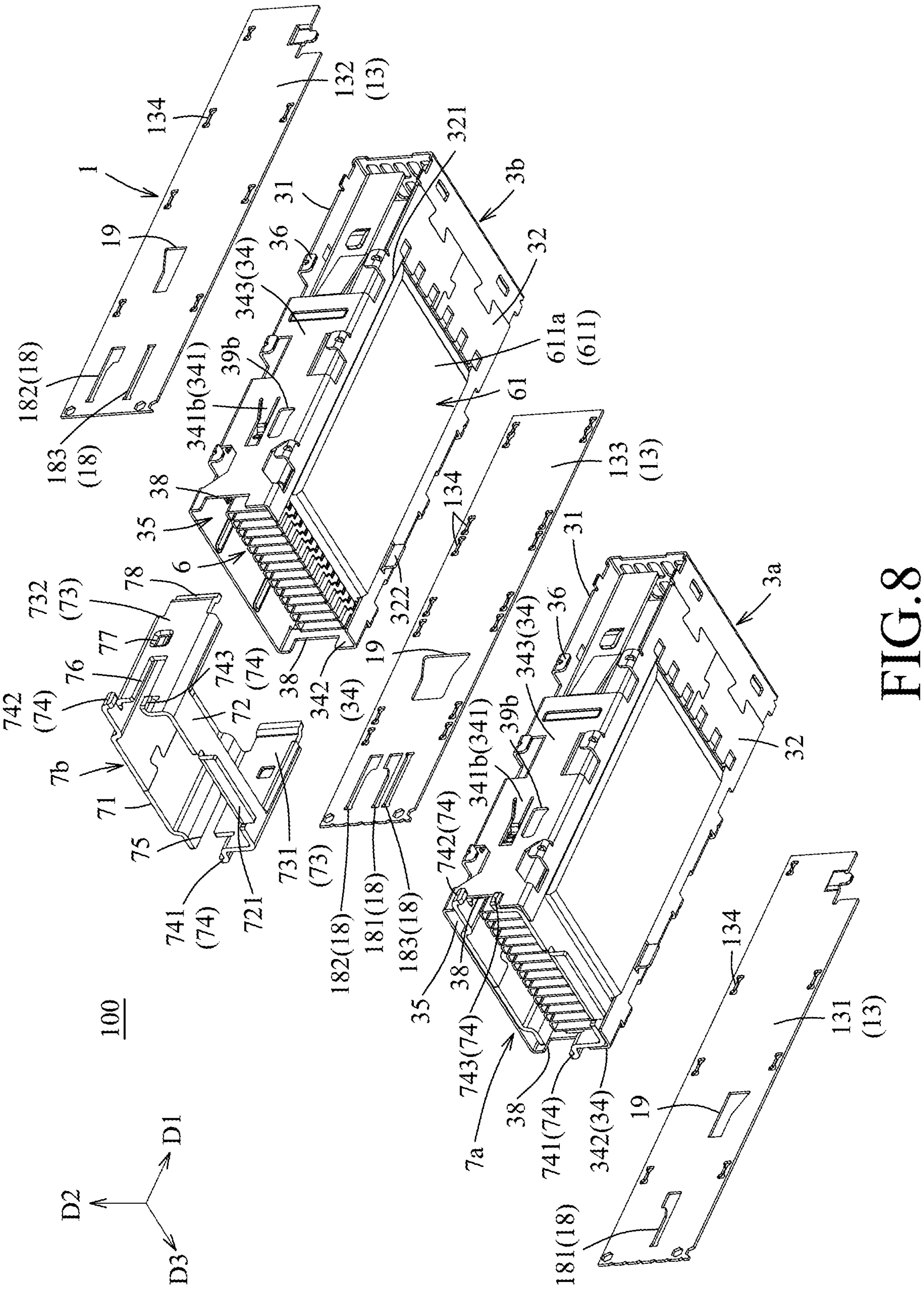
FIG. 8 is a perspective exploded view of the embodiment of FIG. 7 viewed from another angle.
Figure 9:
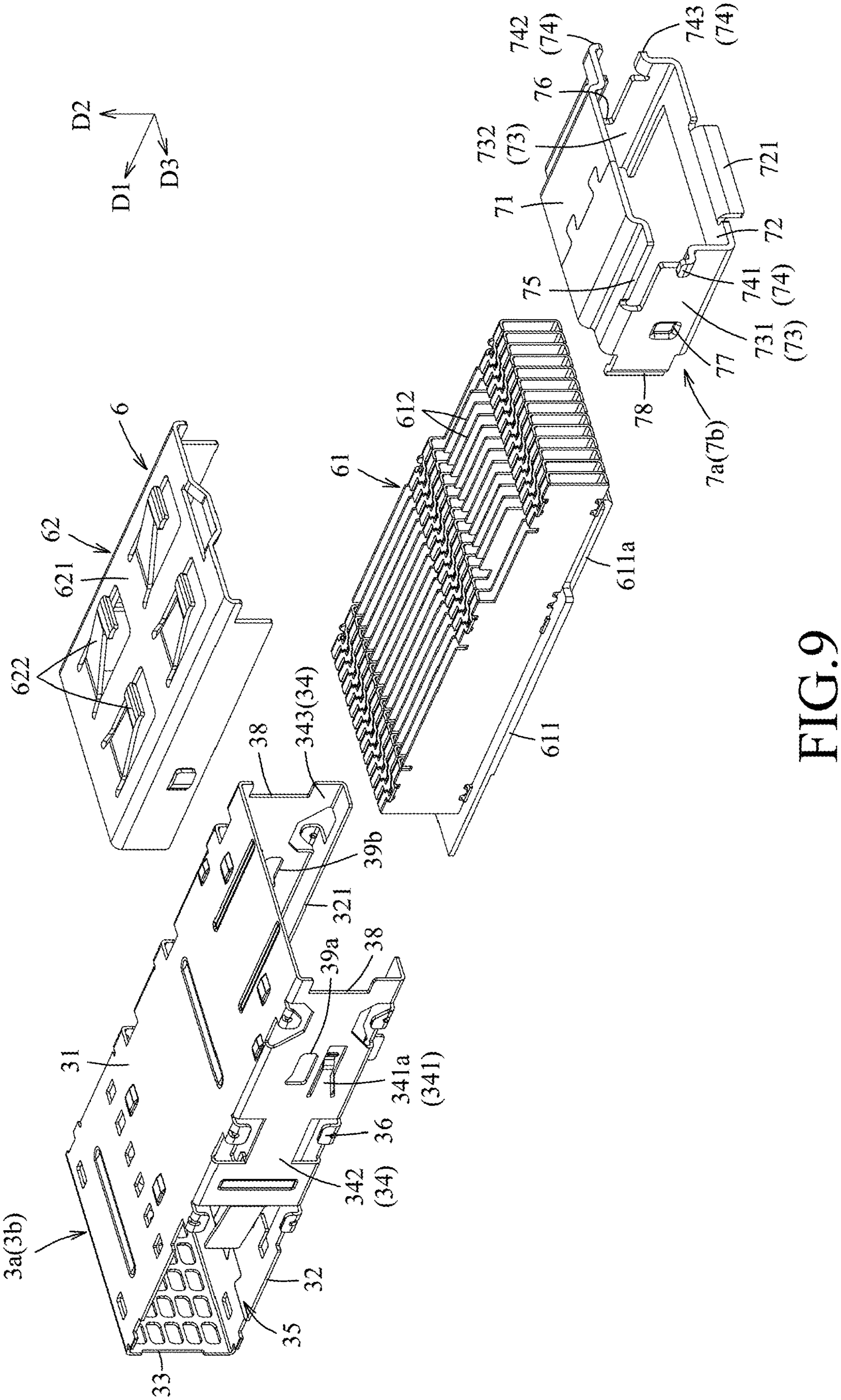
FIG. 9 is a perspective exploded view of the embodiment illustrating the partitioning bracket, the extending bracket and the internal biasing heat sink.
Figure 10:
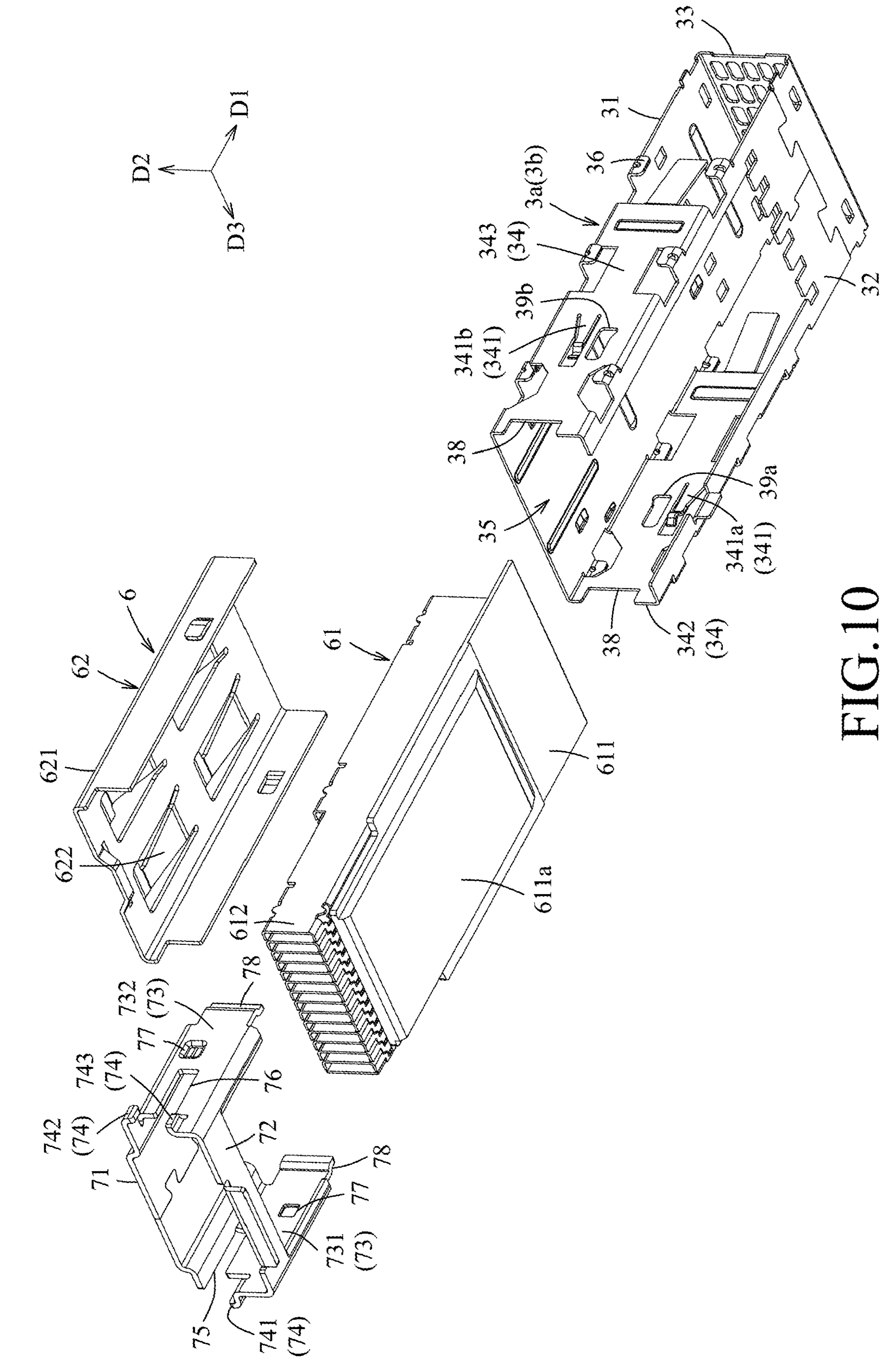
FIG. 10 is a perspective exploded view of the embodiment of FIG. 9 viewed from another angle.
Figure 11:
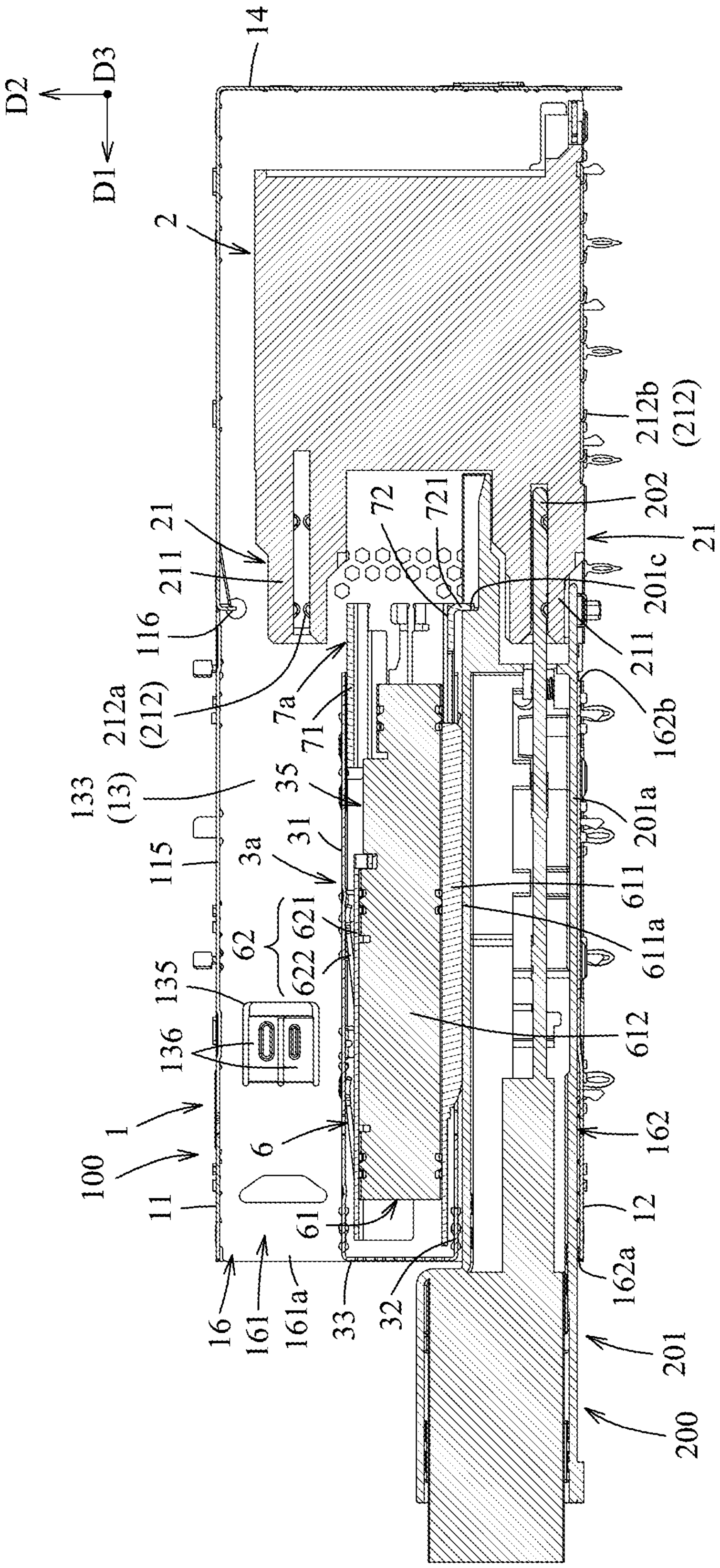
FIG. 11 is a cross sectional view of the embodiment and the pluggable module, in which the upper heat sinks and the clip are omitted, and the pluggable module inserts into a lower receiving space of a receiving passageway to push rearwardly the extending bracket from the front position to a rear position.

Referring to FIG. 4, FIG. 7 and FIG. 11, in addition, in the present embodiment, the lower wall 32 of each extending bracket 7*a*, 7*b* has a lower stopping portion 721 which extends into the corresponding lower receiving space 162 and is used to stop the aligning structure 201*c* of the pluggable module 200 to limit the inserting position of the pluggable module 200, when the extending bracket 7*a*, 7 is in the front position, the pluggable module 200 which enters into the lower receiving space 162 can push the lower stopping portion 721 to make the extending bracket 7*a*, 7*b* rearwardly move to the rear position, so that the pluggable module 200 which enters into the lower receiving space 162 at a first time can employ the lower stopping portion 721 to push the extending bracket 7*a*, 7*b* rearwardly to the rear position, which omits a manual operation step in assembling.

In conclusion, in the connector assembly 100 of the present disclosure, before the assembling operation, the two extending brackets 7*a*, 7*b* which are respectively assembled to the rear ends of the two partitioning brackets 3*a*, 3*b*, can move to the front position where the two extending brackets 7*a*, 7*b* do not interfere with the receptacle connectors 21, and, after assembling operation, the two extending brackets 7*a*, 7*b* can move to the rear position where the two extending brackets 7*a*, 7*b* each at least partially extend into between the receptacle connectors 21, therefore, it can prevent the two extending brackets 7*a*, 7*b* from interfering with the receptacle connectors 21 in the assembling process so as to be beneficial to assembling operation. In addition, the two extending brackets 7*a*, 7*b* are capable of independently moving and doing not interfere with each other. Moreover, by that the guiding members 74 of the extending brackets 7*a*, 7*b* are slidably front and rear provided to the corresponding guiding rails 18 respectively, the two extending brackets 7*a*, 7*b* which are arranged side by side can be guided, limited and supported.

However, what is described above is just the embodiment of the present disclosure, which is not intended to limit the scope implementing the present disclosure, any simple equivalent variations and modifications made according to the claims and the specification of the present disclosure will also be fallen within the scope of the present disclosure.

What is claimed is:

1. A connector assembly comprising:

a guiding shield cage comprising partitioning plates, the partitioning plates comprising guiding rails;

at least two receptacle modules positioned at a rear segment of an interior of the guiding shield cage;

at least two partitioning brackets comprising a first partitioning bracket and a second partitioning bracket, the at least two partitioning brackets being arranged side by side in the guiding shield cage, each partitioning bracket of the at least two partitioning brackets and the guiding shield cage defining an upper receiving space and a lower receiving space, a rear end of each partitioning bracket of the at least two partitioning brackets being positioned in front of a front end of a corresponding receptacle module of the at least two receptacle modules; and at least two extending brackets comprising a first extending bracket and a second extending bracket arranged side by side to one another and coupled to respective rear ends of the first partitioning bracket and the second partitioning bracket, each of the at least two extending brackets comprising a first side wall with a first guiding member and a second side wall with a second guiding member, wherein the first guiding member and the second guiding member are staggered with respect to each other in an up and down direction and are formed to slidably engage with the guiding rails, each of the at least two extending brackets being capable of sliding along the guiding rails between a front position at which the at least two extending brackets are positioned in front of front ends of the at least two receptacle modules and a rear position at which the at least two extending brackets at least partially extend into the at least two receptacle modules.

2. The connector assembly of claim 1, wherein each of the at least two extending brackets further comprises a first avoiding groove of the first side wall and a second avoiding groove of the second side wall, the first avoiding groove and the second avoiding groove of each extending bracket are staggered with respect to each other in an up and down direction; and the second guiding member of the second side wall of the first extending bracket is accommodated in the first avoiding groove of the first side wall of the second extending bracket, and the first guiding member of the first side wall of the second extending bracket is accommodated in the second avoiding groove of the second side wall of the first extending bracket.

3. The connector assembly of claim 2, wherein the partitioning plates of the guiding shield cage comprises a first partitioning plate, a second partitioning plate, and a middle partitioning plate, which is positioned between the first partitioning plate and the second partitioning plate;

the guiding rails of the guiding shield cage comprise first guiding rails of the first partitioning plate and the middle partitioning plate and second guiding rails which are of the middle partitioning plate and the second partitioning plate;

the first guiding member of the first side wall of the first extending bracket is formed to slidably engage with the first guiding rail of the first partitioning plate, the second guiding member of the second side wall of the first extending bracket is formed to slidably engage with the second guiding rail of the middle partitioning plate; and the first guiding member of the first side wall of the second extending bracket is formed to slidably engage with the first guiding rail of the middle partitioning plate, the second guiding member of the second side wall of the second extending bracket is formed to slidably engage with the second guiding rail of the second partitioning plate.

4. The connector assembly of claim 3, wherein each of the at least two extending brackets further comprises a third guiding member of at least one of the first side wall or the second side wall;

the guiding rails of the guiding shield cage further comprise a third guiding rail of at least one of the at least two partitioning plates of the guiding shield cage; and the third guiding member is formed to slidably engage with the corresponding third guiding rail.

5. The connector assembly of claim 4, wherein the third guiding member of each of the at least two extending brackets is formed in the second side wall of the extending bracket;

the third guiding rails of the guiding shield cage are respectively formed in the middle partitioning plate and the second partitioning plate;

the third guiding member of the second side wall of the first extending bracket is formed to slidably engage with the third guiding rail of the middle partitioning plate; and the third guiding member of the second side wall of the second extending bracket is formed to slidably engage with the third guiding rail of the second partitioning plate.

6. The connector assembly of claim 1, wherein the connector assembly further comprises one or more holding members; and each of the at least two extending brackets has a first holding portion which latches with the one or more holding members when each of the at least two extending brackets is in the front position and a second holding portion which latches with the one or more holding members when each of the at least two extending brackets is in the rear position.

7. The connector assembly of claim 6, wherein each of the at least two partitioning brackets comprises side walls; and the one or more holding members comprise elastic latching pieces of the side walls of the at least two partitioning brackets.

8. The connector assembly of claim 7, wherein the first holding portion comprises a recessed groove of the first side wall of the at least two extending brackets; and the second holding portion comprises a recessed channel of the second side wall of the at least two extending brackets.

9. The connector assembly of claim 6, wherein each of the at least two partitioning brackets comprises side walls, the side walls of the at least two partitioning brackets comprise a first side wall and a second side wall;

the holding members comprise elastic latching pieces, the elastic latching pieces comprise first elastic latching pieces on the first side walls of the at least two partitioning brackets and second elastic latching pieces on the second side walls of the at least two partitioning brackets;

the first side wall and the second side wall of the at least two extending brackets each comprise the first holding portion and the second holding portion; and the first elastic latching piece and the second elastic latching piece of each of the at least two partitioning brackets are staggered with respect to each other in an up and down direction, the second elastic latching piece of the first partitioning bracket and the first elastic latching piece of the second partitioning bracket which are adjacent to each other are staggered with respect to each other in an up and down direction.

10. The connector assembly of claim 9, wherein the first holding portion of the first side wall and the first holding portion of the second side wall in each of the at least two extending brackets are staggered with respect to each other in an up and down direction.

11. The connector assembly of claim 9, wherein the partitioning plates of the guiding shield cage comprise openings formed to avoid the elastic latching pieces.

12. The connector assembly of claim 11, wherein each of the at least two partitioning brackets further comprises a first avoid aperture of the first side wall and corresponds to the second elastic latching piece and a second avoid aperture of the second side wall and corresponds to the first elastic latching piece; and the second avoid aperture of the first partitioning bracket avoids the first elastic latching piece of the second partitioning bracket, the first avoid aperture of the second partitioning bracket avoids the second elastic latching piece of the first partitioning bracket.

13. The connector assembly of claim 1, wherein each of the at least two partitioning brackets comprises side walls and guiding member receiving notches on the side walls; and when the at least two extending brackets are in the front position, the guiding members of the at least two extending brackets are received in the guiding member receiving notches of the at least two partitioning brackets.

14. The connector assembly of claim 1, wherein each of the at least two extending brackets comprises a lower stopping portion which extends into the lower receiving space, when the first extending bracket among the at least two extending brackets is in the front position, a pluggable module which enters into the lower receiving space is capable of pushing the lower stopping portion of the first extending bracket to make the first extending bracket move rearwardly to the rear position.

15. The connector assembly of claim 1, wherein each of the at least two partitioning brackets comprises an upper wall and a lower wall which together define an internal receiving space, the lower wall is formed with a lower window which makes the internal receiving space communicated with the lower receiving space;

the connector assembly further comprises two internal biasing heat sinks which are respectively provided to the internal receiving spaces of the at least two partitioning brackets;

the internal biasing heat sink comprises an internal heat dissipating member which extends through the lower window to enter into the lower receiving space, the internal heat dissipating member is capable of movement in an up and down direction; and each of the at least two extending brackets sheathes the corresponding internal heat dissipating member and is further sheathed by the at least two partitioning brackets.

16. A connector assembly comprising:

a guiding shield cage comprising partitioning plates, the partitioning plates comprising guiding rails;

partitioning brackets comprising at least a first partitioning bracket and a second partitioning bracket, wherein when positioned within an interior of the guiding shield cage, the partitioning brackets are arranged side by side to one another and define an upper receiving space and a lower receiving space; and extending brackets comprising at least a first extending bracket and a second extending bracket arranged side by side to one another and coupled to respective rear ends of the first partitioning bracket and the second partitioning bracket, each of the extending brackets comprising a first side wall including a first guiding member and a second side wall including a second guiding member, wherein the first guiding member and the second guiding member are staggered with respect to each other in an up and down direction and are formed to slidably engage with the guiding rails.

17. The connector assembly of claim 16, wherein the connector assembly further comprises holding members, the holding members comprising first elastic latching pieces integral to first side walls of the partitioning brackets and second elastic latching pieces integral to second side walls of the partitioning brackets.

18. The connector assembly of claim 17, wherein the first elastic latching pieces and the second elastic latching pieces of the partitioning brackets are staggered with respect to each other in an up and down direction.

* * * * *